(12) United States Patent
Krausz et al.

(10) Patent No.: US 8,960,683 B2
(45) Date of Patent: Feb. 24, 2015

(54) PIPE COUPLING SEAL

(75) Inventors: Eliezer Krausz, Tel Aviv (IL); Avi Chiproot, Kfar-Saba (IL)

(73) Assignee: Eliezer Krausz Industrial Development Ltd., Tel Aviv (IL)

( * ) Notice: Subject to any disclaimer, the term of this patent is extended or adjusted under 35 U.S.C. 154(b) by 455 days.

(21) Appl. No.: 13/143,344

(22) PCT Filed: Jan. 5, 2010

(86) PCT No.: PCT/US2010/020068
§ 371 (c)(1),
(2), (4) Date: Jul. 6, 2011

(87) PCT Pub. No.: WO2010/080742
PCT Pub. Date: Jul. 15, 2010

(65) Prior Publication Data
US 2011/0266754 A1  Nov. 3, 2011

(51) Int. Cl.
*F16L 5/02* (2006.01)
*F16L 17/04* (2006.01)
*F16L 21/00* (2006.01)
*F16L 25/14* (2006.01)

(52) U.S. Cl.
CPC .............. *F16L 17/04* (2013.01); *F16L 21/005* (2013.01); *F16L 25/14* (2013.01)
USPC ....................................................... 277/605

(58) Field of Classification Search
CPC ............. F16L 21/03; F16L 5/10; F16L 23/22; F16J 15/0887; F16J 15/061
USPC .................. 277/602, 606–609, 616, 314, 315; 285/110, 112, 113, 345, 369, 370
See application file for complete search history.

(56) References Cited

U.S. PATENT DOCUMENTS

| | | | |
|---|---|---|---|
| 3,647,229 A | 3/1972 | Grimes | |
| 3,877,733 A * | 4/1975 | Straub | 285/105 |
| 4,671,541 A | 6/1987 | Webb | |
| 5,056,833 A * | 10/1991 | Webb et al. | 285/148.23 |
| 6,293,556 B1 * | 9/2001 | Krausz | 277/549 |
| 2006/0061090 A1 * | 3/2006 | Krausz et al. | 285/110 |
| 2008/0029970 A1 * | 2/2008 | Krausz et al. | 277/549 |

FOREIGN PATENT DOCUMENTS

| | | | |
|---|---|---|---|
| EP | 0214395 | | 3/1987 |
| EP | 0 909 915 | * | 9/1998 |
| EP | 0909915 | | 4/1999 |
| WO | 2005/010422 | | 2/2005 |
| WO | WO 2005 010422 A1 | * | 2/2005 |
| WO | 2007/110856 | | 10/2007 |
| WO | WO 2007110856 A2 | * | 10/2007 |

OTHER PUBLICATIONS

PCT Written Opinion, PCT/2010/020068.

* cited by examiner

*Primary Examiner* — Kristina Fulton
*Assistant Examiner* — Nathan Cumar
(74) *Attorney, Agent, or Firm* — Dekel Patent Ltd.; David Klein

(57) ABSTRACT

A pipe coupling seal including a cylindrical elastomeric seal (10) including annular pad portions (14, 16) axially spaced apart from one another and extending from a bridge portion (18), each of the pad portions (14, 16) being thicker than the bridge portion (18) and adapted to seal against an outer diameter of a pipe, wherein at least one of the pad portions (14, 16) includes a removable section that includes a continuously enclosed annular hollow void (34).

6 Claims, 3 Drawing Sheets

PIPE COUPLING SEAL

FIELD OF THE INVENTION

The present invention relates to pipe couplings and the sealing thereof. More particularly, the invention provides a pressure balanced elastomer seal and a pipe coupling using said seal whether or not the two pipes to be joined are of the same diameter. The seal is also suitable for repairing of broken or cracked pipes.

BACKGROUND OF THE INVENTION

Pipe couplings have been in service since the dawn of the industrial age, and hundreds of different designs are known. There is no best coupling for all purposes, so users must choose the features required for a particular application, and then choose the lowest cost coupling meeting those specifications. The variables are many: diameter, diameter variability, degree of sealing required, fluid being transferred, hydraulic pressure, exposure to the outside or not; removable or permanent weight limitations, space limitations, ease of installation and other factors all of which influence the selection of a coupling.

Preventing spillage of liquids is the primary requirement, important not only because of the high cost of some liquids, but also for preventing pollution of beaches, water reservoirs and inhabited areas. Even drinking water is becoming a valuable liquid and leakage thereof is no longer tolerated today as it was in the past.

The present inventors have disclosed and received patents on many design variations, relating to removable band-type couplings for large (over 75 mm) diameter pipes where sealing is required.

The present invention is also intended for large diameter pipes. With regard to pipe diameters under 75 mm, standard conventional methods using flanges and/or screw threads are satisfactory. Furthermore there are many special designs, for example swage lock systems, which are cost-effective for small copper tubes, the coupling being of moderate weight.

Sealing elements are widely used in industry, chemical processes, vehicles and almost everywhere that a fluid is transported in a pipeline. Drain lines which are usually not under pressure are also fitted with seals. Most smaller seal elements are available off-the-shelf and large sizes or special designs can usually be quickly manufactured to order.

It is known that when a seal element is in use and is subjected to the high pressure of the fluid being transported there is a tendency for the seal to bend outwards and thus allow spillage of the fluid.

Flexible seal members are used primarily for pipe joints, and the assembly of gauges, filters, flow controllers valves, sealing of broken pipes and the like With regard to the sealing lip being pushed outwards, there are two approaches which are used to solve this problem. All known openable couplings have an opening range of up to 10 mm.

The metal outer casing, in which the seal element is housed or the metal band which is used to apply pressure to the seal, is made in a manner closely restraining the seal form, or at least supporting the seal lip in contact with the pipe. Such a design cannot be used where a pipe is curved or where there is some variation of pipe outer diameter.

The seal can be balanced by providing channels for the seal to be exposed to line pressure on both sides of the seal lip. This prevents seal failure but raises considerable complications, such as difficult and costly machining tasks arise as is seen in following examples.

The following US patents were found which illustrate the complexities of prior art balanced pressure sealing systems. Many of the designs require the drilling in metal of long small-diameter passages for a fluid, sometimes even at an angle other than 90° to the surface, generating a difficult machining task.

Pressure-balanced seal arrangements are seen in U.S. Pat. No. 3,961,798 to Damratowski et al., U.S. Pat. No. 4,327,921 to Reinsma et al., U.S. Pat. No. 4,557,489 to Wentworth, U.S. Pat. No. 4,813,692 to Hailing et al., U.S. Pat. No. 5,080,183 to Schumacher et al., U.S. Pat. No. 5,662,335 to Larsen, U.S. Pat. No. 5,890,881 to Adeff and U.S. Pat. No. 5,988,281 to Douglas et al. All prior-art arrangements require extra machining of metal, some needing special tools and equipment for manufacture. The most pertinent prior are is applicant's patent IL 121796 describing a seal adapted to be used with pipes of different diameters. However, this one was found not satisfactory in some cases with large diameters.

SUMMARY OF THE INVENTION

It is therefore one of the objects of the present invention to obviate the disadvantages of prior art coupling seals and to provide a pressure-balanced seal which remains effective under high pressure.

It is a further object of the present invention to provide a seal which is usable when the pipes being interconnected are of different outer diameter and where the seal can be adapted to the outer diameters in the field.

Another object of the present invention is to provide a pipe coupling holding said pressure balanced seal. It is a further object of the preset invention to provide a seal and a coupling, the opening range thereof is up to 32 mm.

The present invention achieves the above objects by providing an improved elastomer seal element particularly useful in combination with a band-type pipe coupling, said seal element having a cross-section similar to a low-wail U section, two spaced-apart inwardly-facing contact pads being interconnected by a bridge portion, a hollow area being formed and enclosed by each of said contact pads then said seal element is in use, a multiplicity of small spaced-apart transverse apertures hydraulically connecting the inner portion of said U section with said hollow area, a split line enabling said seal element to open said hollow space when free and to seal said hollow space when under pressure from rigid clamping components, the improvement comprising the addition of a narrow void substantially parallel to said bridge portion and extending across about 90% of the width of at least one of said contact pads, the portion of said contact pad beyond said narrow void being easily removed when desired.

In a preferred embodiment of the present invention there is provided a band-type pipe coupling using said seal element.

In a most preferred embodiment of the present invention there is provided a band-type pipe coupling wherein said pipe coupling is arranged to connect two pipes of different outside diameters.

It will thus be realized that the novel seal of the present invention allows removing an inner portion of the contact pad on site, as a sharp knife is all that is required for this purpose. Removal of said Inner portion allows sealing around the larger of the two pipes being connected, without exposing the seal element to excessively high pressure.

Moreover, due to its unique structure the working range is the largest diameter possible, namely up to 32 mm, i.e., from 108 mm up to 140 mm or from 163 mm up to 195 mm.

In practice it is not necessary to provide the narrow void in both contact pads, because the seal element profile is symmetrical about a center line and there is never a need to remove the inner portion of both contact pads.

BRIEF DESCRIPTION OF THE DRAWINGS

The present invention is herein described, by way of example only, with reference to the accompanying figures, wherein.

DETAILED DESCRIPTION OF EMBODIMENTS

Figure 1:
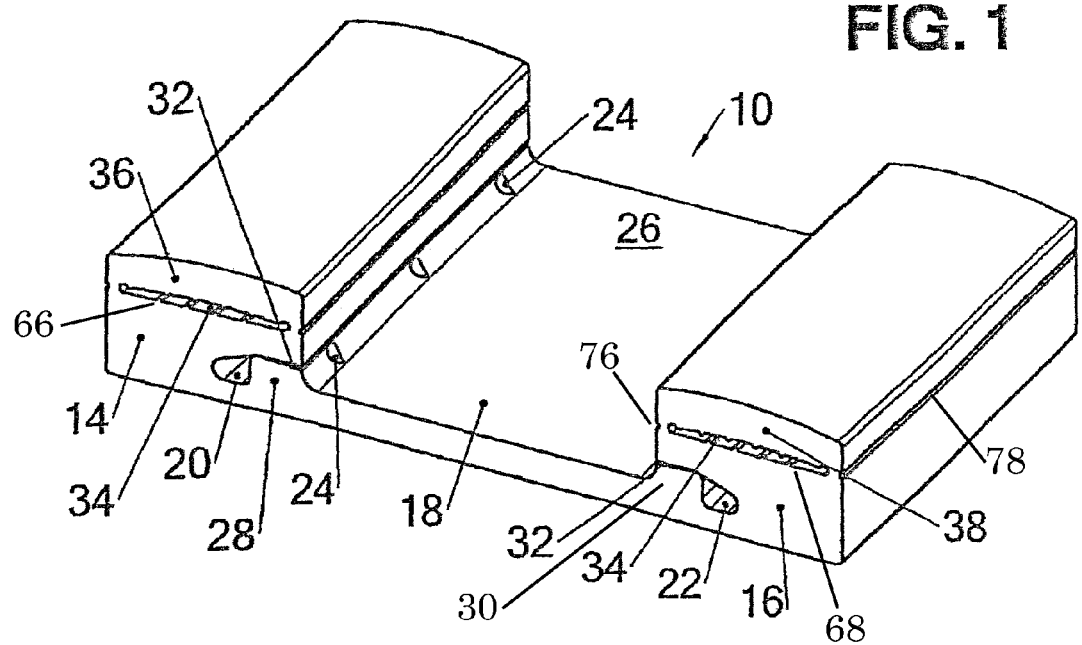
FIG. 1 is a perspective view of a preferred embodiment of the seal according to the invention.

There is seen in FIG. 1 an improved elastomer seal element 10 particularly useful in combination with a band-type pipe coupling 12, 13. Couplings of this type will be seen in FIGS. 3 and 4.

The seal element 10 has a cross-section similar to a low-wall U section. Two spaced-apart inwardly-facing pipe contact pads 14, 16 are interconnected by a bridge portion 18. A small hollow area 20, 22 is formed in each of the contact pads 14, 16 when the seal element is in use.

A multiplicity of small spaced-apart transverse apertures 24 hydraulically connects the inner portion 26 of the U section with the small hollow areas 20, 22. Thus the hydraulic pressure present in the inner portion 26 of the U section when the seal is in use acts between the contact pads 14, 16 which would be pushed outwards under high pressure. By allowing the pressurized fluid to enter the small hollow areas 20, 22 a part of this pressure is counterbalanced and the shape of the profile of the seal element 10 remains unchanged, except for normal height compression.

For convenience of manufacture the seal 10 is extruded in an open condition, that is when the contact pads 14, 16 are spaced apart and are not in contact with sealing projections 28, 30. The form seen in the figure shows the seal element 10 ready for use, and thus said spacing is seen in the figure as a straight split line 32.

The split line 32 enables the seal element to open the small hollow area 20, 22 when free and to seal said area when under pressure from rigid clamping components.

A continuously enclosed annular hollow void 34 is seen substantially parallel to the bridge portion 18 and extending across about 90% of the width of the contact pads 14, 16. The inner portions 36, 38 of the contact pacts 14, 16 beyond the narrow void 34 may if desirable be easily removed on site, by means of a sharp knife, as will be seen in FIG. 4.

Hollow void 34 is accordingly enclosed radially by inner sub-pad portions 36 or 38 and outer sub-pad portions 66 or 68 (FIG. 1) adapted to seal against different outer diameters of pipes, and is enclosed axially by inner and outer walls 76 and 78 that extend between the inner sub-pad portions 36, 38 and outer sub-pad portions 66, 68. The inner sub-pad portion 36 or 38 has an inner diameter smaller than an inner diameter of the outer sub-pad portion 66 or 68. The inner sub-pad portion is removable by cutting through inner and outer walls 76. 78 to expose outer sub-pad portion 66, 68 for sealing against a pipe.

With reference to the rest of the figures, similar reference numerals have been used to identify similar parts.

Figure 2:
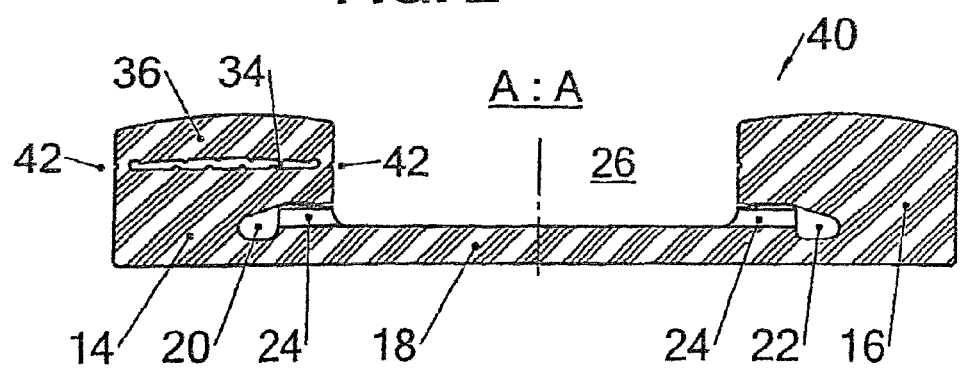
FIG. 2 is a sectioned end view of a second embodiment of the seal.

Referring now to FIG. 2, there is seen a profile of an elastomer seal 40 described similar to 10 described with reference to FIG. 1. Utilizing the fact that the seal profile is symmetrical about a center line AA, only one narrow void 34 is provided, thus reducing the cost of the extrusion die. Small V-guide channels 42 are provided to guide the knife when it is desired to remove the inner portion 36 of a contact pad 14.

Figure 3:
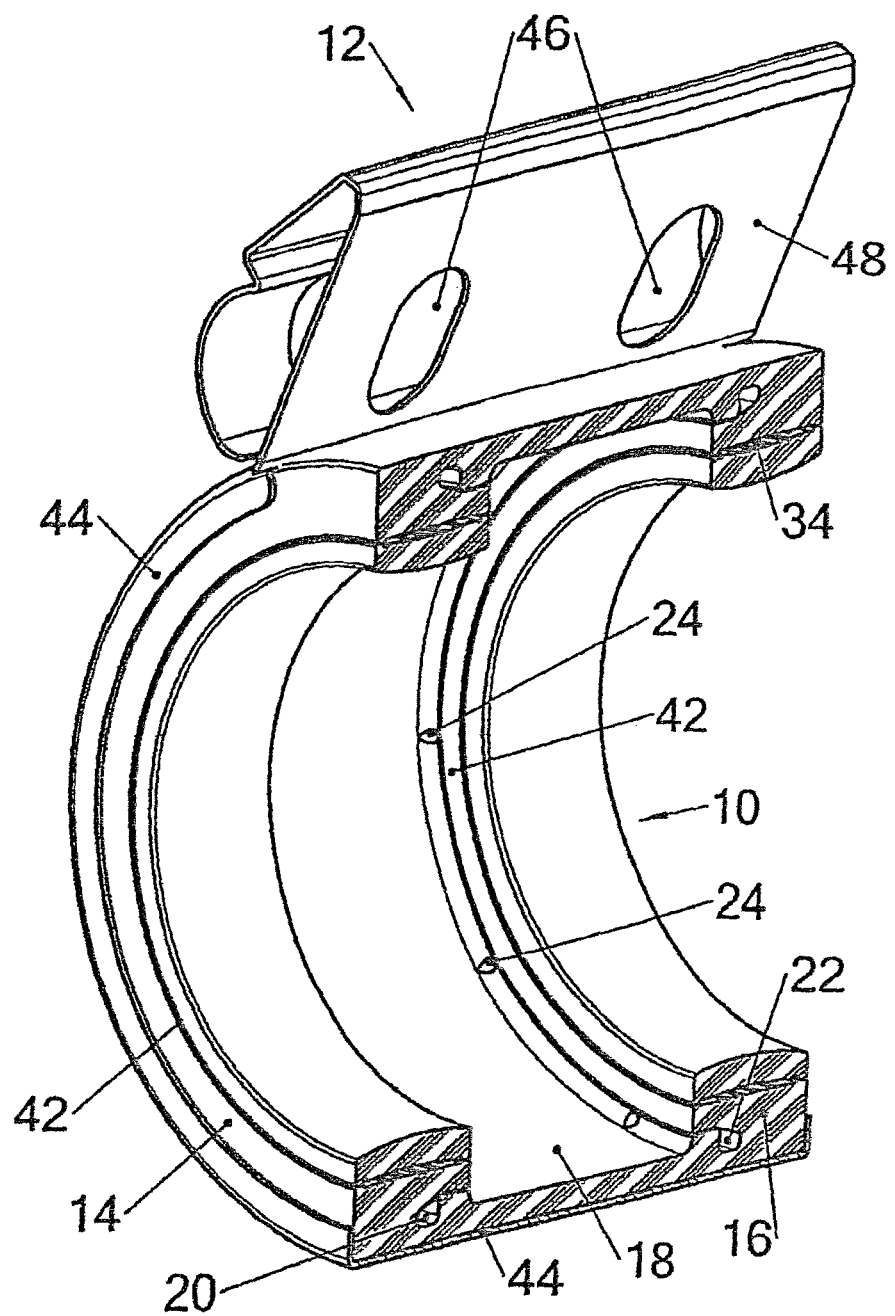
FIG. 3 is a sectioned perspective view of the seal in use in a band pipe coupling.

FIG. 3 illustrates a band-type pipe coupling 12 using the elastomer seal element 10 seen in FIG. 1. The band 44 is a wide low-wall channel constraining the seal element 10. The apertures 46 seen in one of the clamp ears 48 are used by screwed fastening members, not shown, which tighten the band 44. The two pipes 50 are joined, one of which is seen in the following figure, and have the same outer diameter.

Figure 4:
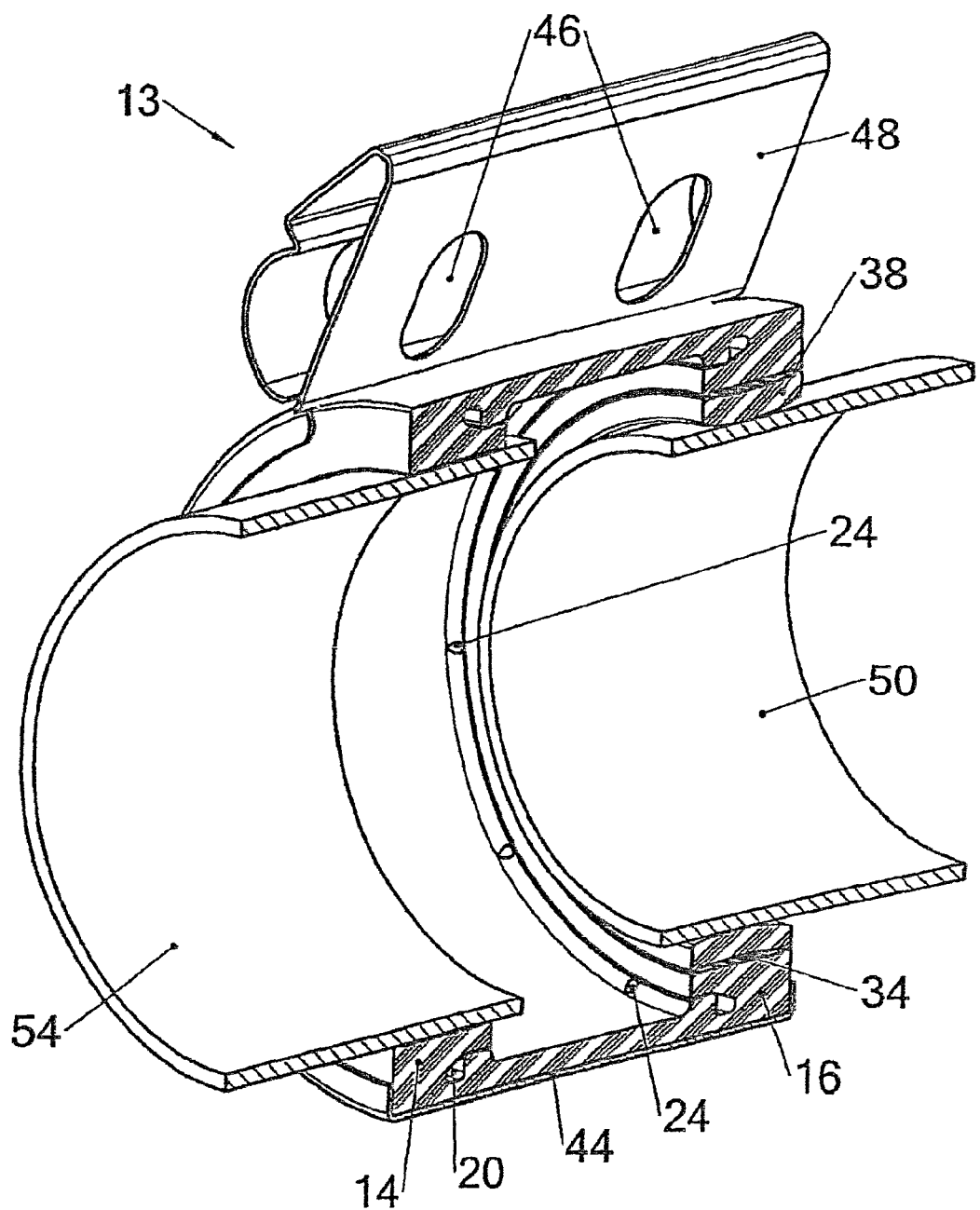
FIG. 4 is a sectioned perspective view of the seal in use in a band pipe coupling arranged to seal two pipes of different outer diameter.

Seen in FIG. 4 is a band-type pipe coupling 13 arranged to connect two pipes 50, 54 of different outside diameters. The larger pipe 54 seen on the left side of the diagram is sealed by a contact pad 14 wherein the inner portion 36 thereof, seen in FIG. 1, has been removed, while the smaller pipe 50 is sealed by a contact pad 16 retaining its original height. The remaining features of the coupling have been described with reference to the previous figures.

It will be appreciated by persons skilled in the art that the present invention is not limited by what has been particularly shown and described hereinabove. Rather the scope of the present invention includes both combinations and subcombinations of the features described hereinabove as well as modifications and variations thereof which would occur to a person of skill in the art upon reading the foregoing description and which are not in the prior art.

What is claimed is:

1. A pipe coupling seal comprising:
a cylindrical elastomeric seal comprising annular pad portions axially spaced apart from one another and extending from a bridge portion, each of said pad portions being thicker than said bridge portion and adapted to seal against an outer diameter of a pipe, wherein at least one of said pad portions comprises a removable section that includes a continuously enclosed annular hollow void, wherein said hollow void is enclosed radially by inner sub-pad portions and outer sub-pad portions adapted to seal against different outer diameters of pipes, and is enclosed axially by inner and outer walls that extend between said inner and outer sub-pad portions, wherein said inner sub-pad portion has an inner diameter smaller than an inner diameter of said outer sub-pad portion, and wherein said inner sub-pad portion is removable by cutting through said inner and outer walls to expose said outer sub-pad portion for sealing against a pipe, and wherein a pair of annular cutting guides comprising a pair of channels are formed on said inner wall outside of said hollow void.

2. The pipe coupling seal according to claim 1, wherein an annular cutting guide channel is formed on said outer wall outside of said hollow void.

3. The pipe coupling seal according to claim 1, wherein said pad portions are formed with a hollow annular portion which fluidly communicates with an area between said pad portions and radially inwards of said bridge portion.

4. The pipe coupling seal according to claim 3, wherein said hollow annular portion fluidly communicates with said area via a split that extends between said hollow angular portion and said area.

5. The pipe coupling seal according to claim 3, wherein said hollow annular portion fluidly communicates with said area via transverse apertures that extend between said hollow angular portion and said area.

6. The pipe coupling seal according to claim 4, wherein said hollow annular portion fluidly communicates with said area via transverse apertures that extend between said hollow angular portion and said area.

* * * * *